2,719,171
OXIDATIVE DEHYDROGENATION PROCESS

George H. Kalb, Landenberg, Pa., assignor to E. I du Pont de Nemours and Company, Wilmington, Del., a corporation of Delaware No Drawing. Application March 28, 1951,
Serial No. 218,076

13 Claims. (Cl. 260—486)

This invention relates to a new process for preparing unsaturated compounds. More particularly, it relates to a new dehydrogenation process leading to the formation of ethylenic double bonds.

It is known that many organic compounds containing ethyl groups can be dehydrogenated to compounds containing vinyl groups by high temperature, vapor-phase contact with certain dehydrogenation catalysts. This process, however, is not free from disadvantages. The yields and conversions are often low. Moreover, the activity of the catalyst often decreases fairly rapidly after the process has been in operation for some time and the initial yields cannot be maintained for sufficiently long periods of time to make the process economically attractive. The present invention provides a process which avoids the use of fixed catalyst beds and is therefore better adapted to giving constant yields.

This invention is a method of preparing unsaturated compounds which comprises heating in the vapor phase in the temperature range of 450° to 800° C. a mixture of (a) an organic compound of the general formula

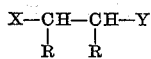

where R is hydrogen or alkyl, X is a radical attached to the group

by a carbon atom which is doubly bonded to another atom, and Y is hydrogen, alkyl, or a radical defined in the same manner as X; (b) oxygen, in the proportion of 0.1 to 2.0 moles per mole of said organic compound; and, (c) as an oxidation (oxidative dehydrogenation) catalyst, iodine, in the proportions of 0.5 to 5% by weight of said organic compound, whereby the ethyl or substituted ethyl group,

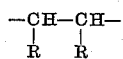

is dehydrogenated to a vinyl or substituted vinyl group.

This invention is suitably carried out by passing the compound to be dehydrogenated, containing from 0.5 to 5% by weight of iodine (preferably from 1 to 4%) through a tubular reactor heated at 450° to 800° C. (preferably 500° to 750° C.) together with oxygen or a gas containing oxygen, such as air, in such amount that there is present from 0.1 to 2.0 moles (preferably from 0.3 to 1.5 moles) of oxygen per mole of organic compound, at a space velocity in the range of 100 to 5000 (preferably 200 to 1800 at the preferred temperature range). Space velocity is the number of cc. of gaseous reaction mixture at standard temperature and pressure per cc. of reaction zone per hour.

The invention is illustrated in greater detail by the following examples, in which parts are by weight unless otherwise noted.

*Example 1.*—Over a period of 3.1 hours, 53 parts (0.51 mole) of methyl isobutyrate containing 2 parts of iodine was passed through a tube heated to 500°±25° C. together with 0.22 mole of oxygen at a space velocity of 273. The tube was packed with silica beads to improve heat transfer. The effluent gas was passed through a trap at 0° C., in which collected 40 parts of condensate. This reaction product contained 12% of methyl methacrylate, corresponding to a 9.5% conversion and a 29% yield, based on the methyl isobutyrate charge.

*Example 2.*—Over a period of 4.7 hours, 69 parts (0.67 mole) of methyl isobutyrate containing 2% by weight of iodine was passed through a tube at 550° C. together with 0.33 mole of oxygen, at a space velocity of 236. The effluent gas was passed through a trap at 0° C., collecting 62 parts of condensate of which 25% was methyl methacrylate. This amounted to a 23% conversion of methyl isobutyrate to methyl methacrylate and to a 70% yield.

In comparison with the above examples, it should be noted that very poor conversions and yields are obtained when methyl isobutyrate is pyrolyzed under similar conditions but in the absence of oxygen and iodine. For example, 74.9 parts of methyl isobutyrate was passed in the course of 2.6 hours through a tube containing 5 parts by volume of 8–14 mesh fused silica at a temperature of 692° to 704° C. and at a space velocity of 1230. There was obtained 33.2 parts of reaction product, of which 12.4 parts was solid formaldehyde polymer. Of the liquid product, 13.7% was methyl methacrylate. This corresponds to a conversion of 3.6% and a yield of 4.6%.

As a further comparison, methyl isobutyrate was pyrolyzed over a dehydrogenation catalyst as follows: 74.1 parts of methyl isobutyrate was passed in the course of 2 hours through a tube containing 5 parts by volume of 8–14 mesh titania gel at a temperature of 549° to 555° C. and at a space velocity of 1625. There was obtained 70.1 grams of reaction product, of which 4.8% was methyl methacrylate. This corresponds to a yield of 46% but the conversion was only 4%.

*Example 3.*—During a period of 65 minutes, a gaseous mixture of 60 parts (0.5 mole) of cumene (isopropylbenzene), 0.6 part of iodine, 5.6 liters (0.25 mole) of oxygen and 5.6 liters of nitrogen, both at standard temperature and pressure, was passed through a quartz reactor tube at 700° C. The tube was packed with quartz chips and the volume of the reaction zone was approximately 14 ml. In this experiment, the contact time was 0.7 second and the space velocity approximately 1450. The reaction product (48.5 parts) which had collected in an ice-cooled receiver and solid carbon dioxide-cooled traps was washed with saturated aqueous potassium iodide solution to remove most of the iodine, dried over anhydrous sodium sulfate, and filtered therefrom with the aid of low boiling petroleum ether. Fractional distillation of this material under reduced pressure gave three fractions which, on the basis of refractive index measurements and infrared analysis, contained 4.73 parts of unchanged cumene and 21.57 parts of alpha-methylstyrene. This corresponds to a 35.9% conversion and 39.9% yield of alpha-methylstyrene, based on the cumene consumed.

*Example 4.*—During 60 minutes, a gaseous mixture of 53 parts (0.5 mole) of ethylbenzene, 0.5 part of iodine, 5.6 liters (0.25 mole) of oxygen and 5.6 liters of nitrogen, both at standard temperature and pressure, was processed as described in Example 3, at a space velocity of about 1600. After removal of the iodine by extraction with aqueous potassium iodide, distillation of the reaction product gave a liquid mixture containing 14.01 parts of unchanged ethylbenzene and 14.99 parts of styrene, as determined by refractive index measurements and infrared analysis. This corresponds to a 28.9% conversion and a 39.3% yield.

*Example 5.*—In the course of one hour a mixture of 72 parts (1.0 mole) of methyl ethyl ketone, 1.44 parts of iodine, 5.6 liters (0.25 mole) of oxygen and 5.6 liters of nitrogen, both at standard temperature and pressure, was passed through a quartz tube filled with quartz chips and heated at 700° C. The space velocity in this experiment was about 1492 and the contact time about 0.7 second. The reaction product which had condensed in the cold receiver (22.1 parts) gave on distillation 8.5 parts of liquid boiling at 70–80° C. at atmospheric pressure. This material was dried over anhydrous sodium sulfate and subjected to infrared analysis, which showed that it consisted of an approximately 50/50 mixture of methyl vinyl ketone and methyl ethyl ketone.

*Example 6.*—Under the conditions of Example 1, succinimide containing 2% of iodine was dehydrogenated with oxygen at a temperature of 500–700° C. From the reaction product was extracted a yellow solid material which was shown to be maleimide through the adduct it formed with cyclopentadiene (Diels-Alder reaction). The cyclopentadiene adduct of the reaction product melted at 182–183.5° C. A cyclopentadiene/maleimide adduct from an authentic sample of maleimide melted at 184–185° C., and a mixture of the two adducts melted at 181.5–183.5° C.

The process of this invention is applicable to the oxidative dehydrogenation of any organic compound of the type already defined. These compounds may alternatively be defined as those containing the group $$-\underset{R}{CH}-\underset{R}{CH}-$$

where R is hydrogen or alkyl, at least one of the free valences of said group being attached to an organic radical through a carbon atom doubly bonded to another atom, the other free valence, if any, being satisfied by hydrogen or an alkyl group. Other compounds suitable for use in this invention include, for example, esters such as ethyl propionate, n-hexyl propionate, cyclohexyl isobutyrate, phenyl propionate, ethyl beta-phenyl-propionate, methyl 2-phenyloctanoate, etc.—ketones such as diethyl ketone, methylisopropyl ketone, ethylphenyl ketone, etc.—aldehydes such as ethanal and propanal; hydrocarbons such as butene-1, methyl-2-butene-3, o-diethyl-benzene, alpha-ethylnaphthalene, 1-ethyl-cyclohexene-1, 1,2-diphenylethane, 1,2-diphenyloctane, etc.—acids such as propionic and isobutyric acids, their amides and anhydrides; heterocyclics having intracyclic double bonds such as 2-ethylpyrrole, 2-ethylfuran, 2-isopropylthiophene, etc.—and the like. The compound to be dehydrogenated may contain more than one ethyl or substituted ethyl group attached to doubly bonded carbon, in which case these additional groups may also undergo dehydrogenation. Preferably, any alkyl or cycloalkyl group present in the molecule to be dehydrogenated contains from 1 to 6 carbon atoms. The best results are obtained when the $$-\underset{R}{CH}-\underset{R}{CH}-$$

group is attached to either (*a*) a carbon atom which is part of an aromatic nucleus, particularly a hydrocarbon nucleus, and therefore is one terminal of intracyclic double bonds; or, (*b*) an aliphatic carbon atom doubly bonded to oxygen, and particularly the carbonyl carbon of an ester of an aliphatic carboxylic acid. The reaction is more clean-cut and gives better results when the compound to be dehydrogenated has a total of 3 to 10 carbon atoms, and particularly when the $$-\underset{R}{CH}-\underset{R}{CH}-$$

group is ethyl or isopropyl.

As shown in the examples, either pure oxygen or oxygen mixed with inert diluents such as nitrogen or carbon dioxide can be used in the process of this invention. Thus the oxygen may be introduced into the reaction vessel in the form of oxygen-nitrogen mixtures, such as air, or of oxygen-carbon dioxide mixtures. The oxygen, or the gas mixture containing it, may be introduced at more than one point along the reaction vessel, if desired, to avoid a large excess of oxygen near the inlet of the reaction vessel. Reduced pressures may be used if desired. Instead of using free iodine, it is possible, although there is no advantage in doing so, to use hydrogen iodide, which liberates iodine in situ at the reaction temperature. Conversely, the use of free iodine produces a certain amount of hydrogen iodide in the reaction mixture. Similarly, alkyl iodides may be used in the reaction since they liberate iodine under the reaction conditions.

The compound to be dehydrogenated and the iodine catalyst may, if desired, be vaporized by preheating before passage through the reaction vessel, or a solution of iodine in the compound may be dropped at a controlled rate into the reaction vessel. The latter may contain inert contact masses such as fused quartz chips or glass beads or it may be an empty tubular reactor. Any inert construction material may be used such as glass, quartz, silver- or porcelain-lined metal and the like. The reaction product is preferably collected by condensing the effluent gas in a suitable cold trap. The unsaturated compound is separated by fractionation or other suitable means from the unreacted starting material and the latter may be recirculated. The iodine present in the reaction product can be separated therefrom by chemical means, such as extraction with aqueous sodium thiosulfate or with aqueous potassium iodide, or by physical means such as distillation or steam distillation.

The process of this invention makes available compounds having vinyl or substituted vinyl, e. g., isopropenyl, groups. As is known, these compounds are useful in many chemical processes, and specifically as the starting materials for a number of technically valuable polymers and copolymers.

I claim:

1. The method for preparing unsaturated compounds which comprises heating in the vapor phase at a temperature in the range of 450° to 800° C. with molecular oxygen in the presence of iodine, an organic compound having an alkyl group of the class consisting of ethyl and isopropyl groups attached to a carbon atom which is doubly bonded to another atom, whereby the said alkyl group is oxidatively dehydrogenated to an alkenyl group, said organic compound having from 3 to 10 carbon atoms per molecule, said organic compound being further limited to include only: carbocyclic compounds; N-heterocyclic compounds; and aliphatic compounds wherein the atom doubly bonded to the said carbon atom is oxygen.

2. The process of claim 1 wherein the quantity of oxygen employed is from 0.1 to 2.0 moles per mole of the organic compound subjected to oxidative dehydrogenation.

3. The process of claim 1 wherein the said organic compound is methyl isobutyrate.

4. The process of claim 1 wherein the said organic compound is cumene.

5. The method of claim 1 wherein the said organic compound is ethyl benzene.

6. The method of claim 1 wherein the said organic compound is methyl ethyl ketone.

7. A process for preparing methyl vinyl ketone which comprises heating methyl ethyl ketone in the vapor phase with 0.3 to 1.5 moles of molecular oxygen at a temperature of 500° to 750° C., at a space velocity of 200 to 1800, in the presence of 0.5 to 5.0% of iodine based on the weight of methyl ethyl ketone, whereby oxidative dehydrogenation of methyl ethyl ketone, resulting in the formation of methyl vinyl ketone, occurs, and thereafter separating methyl vinyl ketone from the products thereby obtained.

8. The method for preparing methyl methacrylate by oxidative dehydrogenation of methyl isobutyrate with oxygen at 450° to 800° C. in the presence of iodine as catalyst.

9. The method of claim 8 wherein the temperature is within the range of 500° to 750° C.

10. A process for preparing methyl methacrylate which comprises heating methyl isobutyrate in the vapor phase with 0.1 to 2.0 moles of molecular oxygen at a temperature of 500° to 750° C., at a space velocity of 100 to 5000, in the presence of 0.5 to 5.0% of iodine based on the weight of methyl isobutyrate, whereby oxidative dehydrogenation of methyl isobutyrate, resulting in the formation of methyl methacrylate, occurs, and thereafter separating methyl methacrylate from the products thereby obtained.

11. A process for preparing methyl methacrylate which comprises heating methyl isobutyrate in the vapor phase with 0.3 to 1.5 moles of molecular oxygen at a temperature of 500° to 750° C., at a space velocity of 200 to 1800, in the presence of 0.5 to 5.0% of iodine based on the weight of methyl isobutyrate, whereby oxidative dehydrogenation of methyl isobutyrate, resulting in the formation of methyl methacrylate, occurs, and thereafter separating methyl methacrylate from the products thereby obtained.

12. A process for preparing alpha-methylstyrene which comprises heating cumene in the vapor phase with 0.3 to 1.5 moles of molecular oxygen at a temperature of 500° to 750° C., at a space velocity of 200 to 1800, in the presence of 0.5 to 5.0% of iodine based on the weight of cumene, whereby oxidative dehydrogenation of cumene, resulting in the formation of alpha-methylstyrene, occurs, and thereafter separating alpha-methylstyrene from the products thereby obtained.

13. A process for preparing styrene which comprises heating ethyl benzene in the vapor phase with 0.3 to 1.5 moles of molecular oxygen at a temperature of 500° to 750° C., at a space velocity of 200 to 1800, in the presence of 0.5 to 5.0% iodine based on the weight of ethyl benzene, whereby oxidative dehydrogenation of ethyl benzene, resulting in the formation of styrene, occurs, and thereafter separating styrene from the products thereby obtained.

References Cited in the file of this patent

McCullough et al.: Industrial and Engineering Chem., vol. 41 (No. 7) pp. 1455–59, July 1949.

Bairstow et al.: J. Chem. Soc. (London) 1933, pp. 1147–55.

Chemical Abstract., vol. 41, p. 5465 citing Tonomura, Bull. Inst. Phys. Chem. (Tokyo) 21, pp. 774–803.

Hibbert, JACS, vol. 37, pp. 1748–63 (1915).

Fisher et al., Ind. and Eng. Chem., vol. 36, pp. 229–234.